United States Patent
Rui et al.

(10) Patent No.: US 8,010,845 B2
(45) Date of Patent: Aug. 30, 2011

(54) SYSTEM AND METHOD FOR ERROR REPORTING IN SOFTWARE APPLICATIONS

(75) Inventors: Su Ying Rui, Bejing (CN); Shou Hui Wang, Beijing (CN); Zhi Yu Yue, Beijing (CN); Li Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 12/323,501

(22) Filed: Nov. 26, 2008

(65) Prior Publication Data

US 2009/0138766 A1    May 28, 2009

(30) Foreign Application Priority Data

Nov. 28, 2007 (CN) .......................... 2007 1 0192869

(51) Int. Cl.
*G06F 11/00* (2006.01)
(52) U.S. Cl. ........................................ 714/38.1; 714/48
(58) Field of Classification Search ................... 714/48, 714/38
See application file for complete search history.

(56) References Cited

U.S. PATENT DOCUMENTS

| | | | |
|---|---|---|---|
| 7,421,490 B2 * | 9/2008 | Bharati et al. ................ 709/224 |
| 7,516,438 B1 * | 4/2009 | Leonard et al. ............... 717/102 |
| 7,702,959 B2 * | 4/2010 | Hwang et al. .................. 714/38 |
| 7,770,069 B2 * | 8/2010 | Prescott et al. ................. 714/38 |
| 2003/0208593 A1 * | 11/2003 | Bharati et al. ................ 709/224 |
| 2004/0078726 A1 * | 4/2004 | Little et al. ...................... 714/48 |
| 2005/0278587 A1 * | 12/2005 | Breitling et al. ................ 714/48 |
| 2007/0061634 A1 * | 3/2007 | Marisetty et al. ............... 714/48 |
| 2008/0263406 A1 * | 10/2008 | Prescott et al. ................. 714/38 |
| 2008/0307266 A1 * | 12/2008 | Chandrasekaran ............. 714/38 |
| 2009/0089621 A1 * | 4/2009 | Zhang ............................. 714/38 |
| 2009/0187796 A1 * | 7/2009 | Adams et al. .................. 714/48 |
| 2010/0107145 A1 * | 4/2010 | Warren et al. ................. 717/131 |
| 2010/0192132 A1 * | 7/2010 | Yuan et al. .................... 717/128 |

* cited by examiner

*Primary Examiner* — Yolanda L Wilson
(74) *Attorney, Agent, or Firm* — Daniel McLoughlin; Hoffman Warnick LLC

(57) ABSTRACT

The invention relates to a system and a method for error reporting in software applications. A system in accordance with an embodiment includes: a dummy document generating unit for generating a dummy document from an original document, wherein the dummy document maintains a skeleton of the original document and contains dummy data as its content; and a dummy document reporting unit for sending the generated dummy document in an error report.

19 Claims, 4 Drawing Sheets

SYSTEM AND METHOD FOR ERROR REPORTING IN SOFTWARE APPLICATIONS

TECHNICAL FIELD

The present invention relates to a system and a method for error reporting in software applications.

BACKGROUND ART

Error reporting is a popular subsystem in end-user-faced software applications. For instance, some operating systems have an error reporting system to support the operating system per se and applications running on it. When an error, e.g., a crash event, happens, the applications will popup a dialog to prompt the user whether to send the error report to the software manufacturer. The error reports collected by the manufacturer are very essential in software customer service and product improvement, and are valuable especially in user scenario reproduction to fix defects.

FIG. 1 shows an example of an error report dialog, which may appear when a problem occurs in an application, in which the user is provided with options to choose whether to send the error report. The error report is sent from the user's system to a remote site, in order to help the manufacturer in reproducing the error and upgrading its products. Such an error report usually contains:

Where the problem happened in the software or hardware. Occasionally, empty files might be included as an initial indication of a problem.
Type or severity of the problem, if known.
Files that are of help to describe the problem (typically system or report-generated files about the software behavior before or after the problem occurred).
Basic software and hardware information (such as operating system version and language, device module and manufacturer, or memory and hard disk size).
Memory Dump of the application.

A memory dump is very helpful to developers to trace out the problem. Unfortunately, a memory dump may include sensitive user information. For example, a memory dump may produce information including the contents of a document, so that the confidential data thereof cannot be protected in the error reporting system any longer. The possibility of leaking a user's privacy in error reporting solutions makes the users of software applications prefer not to send error reports rather than take the risk of leaking their sensitive information.

SUMMARY OF THE INVENTION

The present invention provides a system and a method for collecting useful information from a user environment to help customer service in error reporting and at the same time to protect users' privacy to some extent.

The present invention provides an error reporting system used in a software application. The error reporting system comprises a dummy document generating unit and a dummy document reporting unit. The dummy document generating unit is used for generating a dummy document from an original document, wherein the dummy document maintains the skeleton of the original document and contains dummy data as its content. The dummy document reporting unit sends the generated dummy document as a whole or part of the error report.

According to the invention, the dummy document generation unit comprises: a document parser configured to parse the original document into an internal format, which reflects the skeleton and the structural description of the content in memory of the document; and a document content replacer configured to generate dummy data having no semantic relationship by using one of different strategies in accordance with the type of the document object in the internal format, replace the content of the document with the generated dummy data, and then recover the dummy document obtained by replacement from the internal format to the format supporting the storage and presentation of the document.

When extended ability of processing is needed in the document content replacer, for example, when the content to be replaced includes a long string, an additional dummy data generator can be provided in the dummy document generation unit, which is configured to generate dummy data upon the request from the document content replacer, and return the generated dummy data back to the document content replacer for replacing the content In an embodiment of the invention, as complex dummy data, such as graphics or OLE objects, is required to be formed, a dummy data repository for storing the dummy data materials is further provided. Typically, in the dummy data repository various OLE objects, graphics with different sizes, etc., can be stored. If required, dummy data that complies with the required dummy data generation strategy is obtained by the dummy data generator from the dummy data repository, and is returned back to the document content replacer for replacement.

The error reporting system according to the invention can either be started initiatively by the user through a starting user interface unit, or can be started automatically by the software application upon detection of an error in the application.

Furthermore, the purpose of the invention is also achieved by a method for realizing error reporting in a software application. The error reporting method comprises: parsing an original document into an internal format, which reflects the skeleton and the structural description of the content in memory of the document; checking the type of the document object, and determining one of different dummy data generation strategies according to the type of the document object; generating dummy data according to the determined dummy data generation strategy; replacing the content of the document with the generated dummy data while keeping the skeleton of the original document; recovering the replaced dummy document from the internal format to the original description format; and sending the generated dummy document as a whole or part of error report.

Usually, a document can be considered as made of two components, i.e., document skeleton and document content, wherein the document skeleton describes the structure of the document, while the document content often contains more sensitive semantic information. The description of the document skeleton is of the most importance in case an error is to be reproduced, whereas in many cases the document content can be replaced.

Considering the sentence "Bob earns 5000 dollars per month" as an example, its content is a person named Bob whose salary is $5000/month, and the carrier of the content is a string with 28 characters and 4 digits. For a document editor software application, the string "Bob earns 5000 dollars per month" is equal to a random generated string with the same presentation properties in storage, rendering and formatting, for example "Odh htels 8263 tiahtloa elw oihgfo." A user may consider the sentence "Bob earns 5000 dollars per month" as confidential information, but may not have the same feeling to the string "Odh htels 8263 tiahtloa elw oihgfo," because it does not provide any semantic meaning for a reader. Therefore, the first string containing semantic meaning can be replaced with the second string. The second string has a "dummy" content, i.e., the content of the string is meaningless for the reader, while the original skeleton structure is retained as much as possible.

From the developing experience of the technical persons and defect root cause static, more than half of the defects which need a sample document to be presented can be reproduced with an alternative document which has the same document skeleton as the original document but with dummy content. So a dummy document with the same document skeleton in an error reporting is also useful in helping customer service, and this will protect the user's privacy in some degree.

In the context of the invention, this type of document with the original content having semantic meaning removed and with essentially the same document skeleton as the original one is defined as a "dummy document." From technical point of view, a dummy document is a second instance of the source document with essentially the same file skeleton. When an error happens or is invoked by a user, a dummy document can be generated from the original document automatically and be sent through an error reporting subsystem, thereby protecting the user's privacy.

DETAILED DESCRIPTION OF THE INVENTION

In the context of the invention, document information is grouped into two types, i.e., document content and document skeleton. Document content means the concrete information related to semantics in form of strings, numbers, graphics, OLE objects, text in drawing objects, etc. Document skeleton means the document structure information such as styles, properties, layouts, table structures, chart properties, graphic metadata, OLE metadata, paragraph definitions, position information of objects, spreadsheet cell formats, references in documents, etc. Further, document settings, such as display settings, charge track setting, view settings, spell check settings, etc., are also considered as document skeleton.

Figure 1:
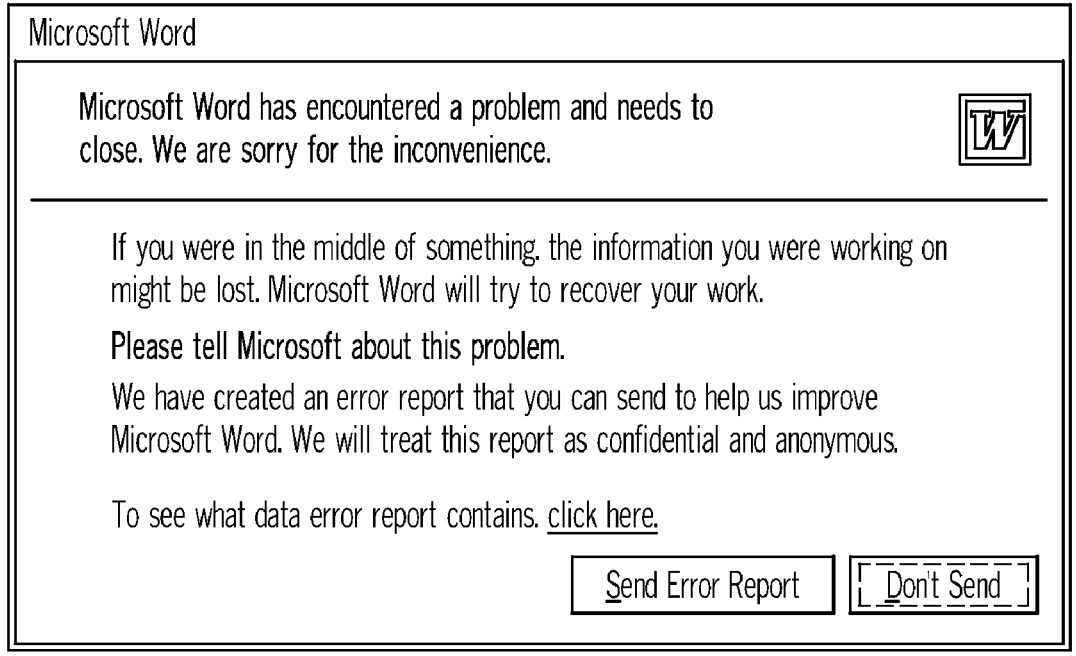
FIG. 1 shows an illustrative error reporting dialog.
Figure 2:
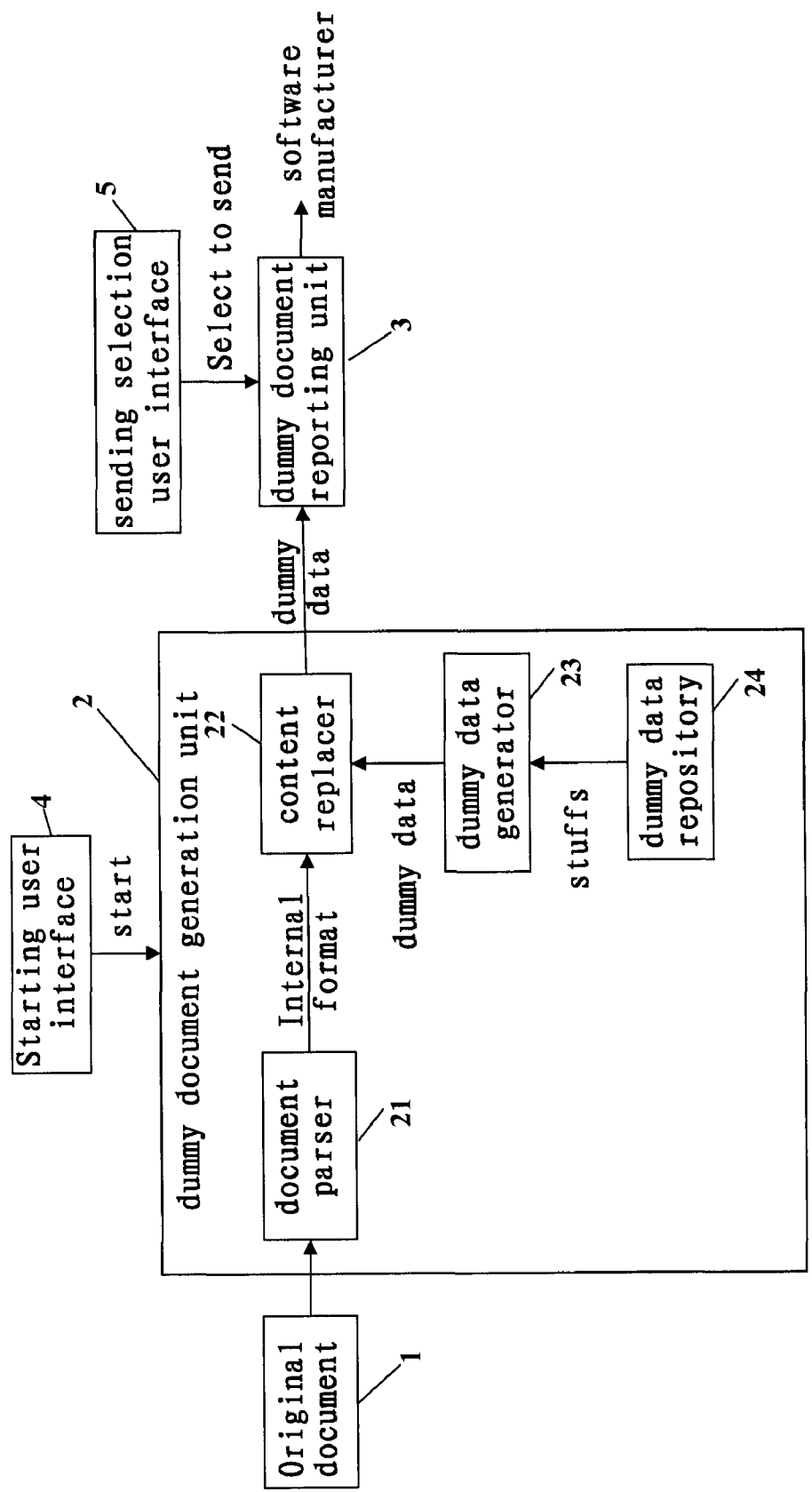
FIG. 2 shows a structural block diagram of an error reporting system according to the invention.

FIG. 2 shows a structural block diagram of an error reporting system according to the invention. Original document 1 in the figure is a source document data model. It may be a document on hard disk or a data structure in memory, and may have various formats which support the storage and presentation of a document, such as ODF, XML, Bin, etc. The original document 1 contains all information of the source document, including metadata of the document (author, date of edit, etc.), document skeleton (paragraph definition, style and properties, data relationship, etc.), document settings (character set setting, file display setting, change track configuration, etc.) and the like.

Dummy document generating unit 2 retrieves necessary information from the original document 1, and generates a dummy file by using the information. Dummy document generating unit 2 comprises a document parser 21 for parsing the original document stored in the storage medium into an internal format, which internal format reflects the skeleton of the document and the description of the content in memory. For example, the internal format can be XML based, bin based, object document format, DOM tree, or other type of memory data structure. Document parser 21 can be considered as a semantics analyzer, which may be a standard tool provided by software manufacturers and is generally known in the art.

The dummy document generating unit 2 further comprises a document content replacer 22 for replacing the document content with dummy data not related in semantics in the internal format, while retaining the document skeleton unchanged as much as possible, and then transforming the generated dummy document back into the format supporting the storage and presentation of a document, such as to generate a dummy document. There are different dummy data generation strategies with regard to different object types. As for a string object for example, a random string can be produced as dummy data to replace the original content. The string as dummy data and the original string object typically belongs to the same character set, and they typically have the same length.

Dummy document generating unit 2 supplies a dummy document reporting unit 3 with the dummy document generated by document content replacer 22. Dummy document reporting unit 3 sends the dummy document, as a whole or a part of the error report, to the software manufacturer through an error reporting channel. The dummy document reporting unit 3 can be either a separate functional unit, or can be integrated into the whole error reporting system as a subsystem.

Figure 3:
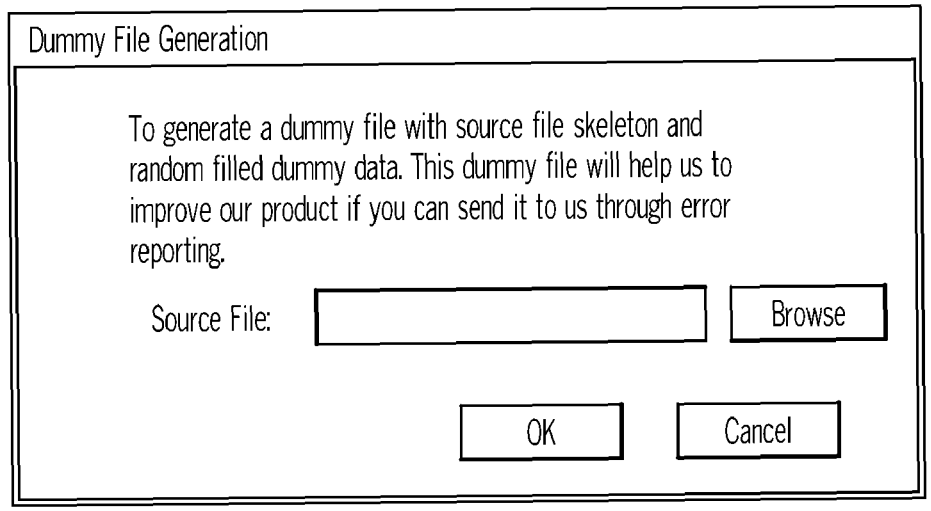
FIG. 3 shows an example of the starting user interface of the inventive error reporting system for generating a dummy document.

Alternatively, the function of generating dummy document according to the invention can be started in two ways. In the first way, a user may invoke the dummy document generation actively, for example by issuing a performance command in a document when the document is loaded. In the second way, the application may invoke dummy file generation automatically upon detection of an error in the application. Therefore, in the error reporting system a starting user interface 4 for providing the user with options to launch the dummy document generation can be provided. An example of such a user interface is shown in FIG. 3.

Figure 4:
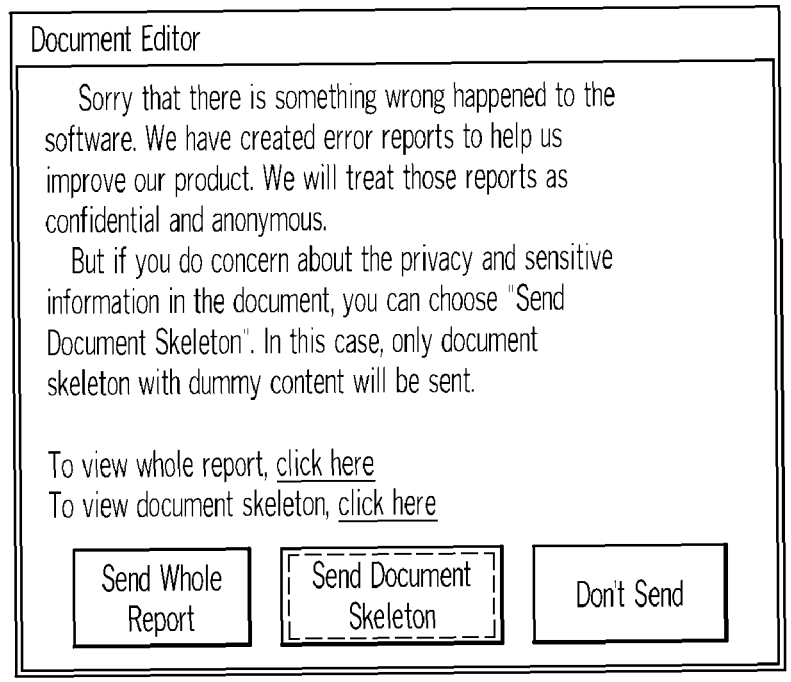
FIG. 4 shows an example of the sending selection user interface for providing the user with options to view and/or send the dummy document.

When a dummy document is generated, the error reporting system according to the invention may provide the user with options to view and/or send the dummy document via a sending selection user interface 5. An example of such a sending selection user interface 5 is shown in FIG. 4. The user may choose to send the whole error report, to only send the dummy document with the document skeleton, or not to send an error report at all.

For example, if the content to be replaced includes a long string, or if complex dummy data like graphics or OLE objects is to be produced, dummy generation unit 2 further comprises a dummy data generator 23 as a functional extension for document content replacer 22, which takes over the function of dummy data generation and returns the generated dummy data back to document content replacer 22 for replacement.

In case that the content to be replaced comprises graphics or OLE objects, in dummy document generating unit 2 a dummy data repository 24 is further provided for storing dummy data materials. In the dummy data repository 24 different OLE objects, graphics of different sizes or the like can be stored. When such content is to be replaced, dummy data generator 23 obtains dummy data material which meets the corresponding requirement from dummy data repository 24, and returns the same as dummy data to document content replacer 22.

Figure 5:
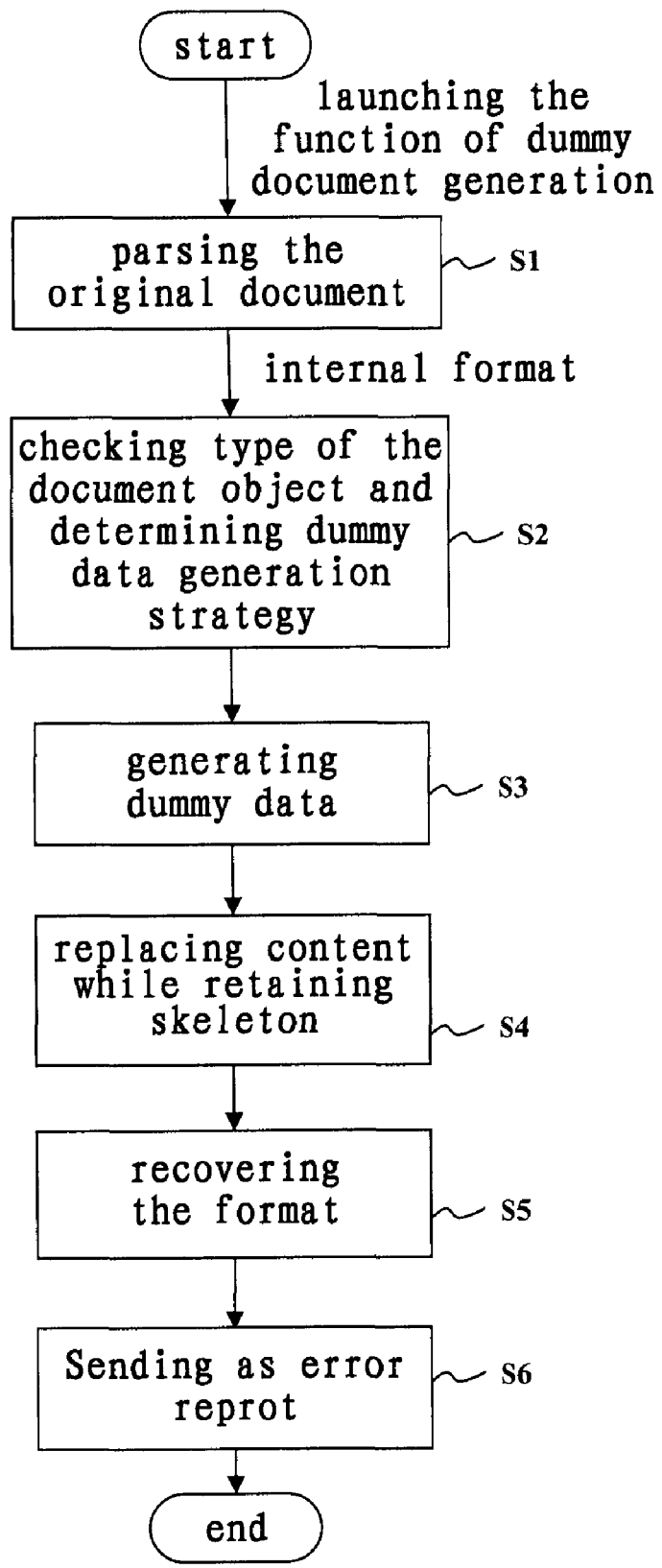
FIG. 5 shows a flow chart for sending an error report by means of the dummy document according to the invention.

The flow chart in FIG. 5 shows the steps for sending an error report with dummy document according to the invention.

When a message for starting the dummy document generation by referring to a source document is received (this kind of message may either be invoked by a user or be automatically invoked by an application upon detection of an error), the original document parsed at step S1, and thereby the original document is parsed into an internal format reflecting the skeleton and the description of the content in memory of the document. Taking a document in ODF format, for example, SAX (a standard XSL parser) is assumed to be the parser. Naturally, other known parsers can also be used.

After the parsing process has been completed, a check of the type of the document object is performed in the obtained internal format at step S2, in order to make known the content and properties of the object. Then, corresponding dummy data is generated at step S3 according to the determined replacement strategy.

At step S4, the content portion of the original document object is replaced with the dummy data, while the skeleton of the original document object is retained as much as possible. After that, the replaced document object is transformed from the internal format back to the format supporting the storage and presentation of document at step S5. Finally, the obtained dummy document is sent to the software manufacturer as a whole or a part of the error report at step S6.

Here we also take a short document for example. The document contains a sentence "Bob earns 5000 dollars per month" and Bob's photo in graphics format. Document parser 21 reads the sentence "Bob earns 5000 dollars per month," in which "Bob" is in bold, "5000" is in italic, and "per" is in pink and underlined. The XML segment reads like the following:

```
<text:p text:style-name="P2">
    <text:span text:style-name="T3">Bob</text:span>
    earns<text:span text:style-name="T4">5000</text:span>
    dollars<text:span text:style-name=<T5>per</text:span>
    month
</text:p>
...
<draw:frame draw:style-name="fr1" draw:name="graphics1"
text:anchor-type="paragraph" svg:width="4.897cm"
svg:height="4.925cm" draw:z-index="0">
    <draw:image xlink:href="Pictures/
    20000008000013210000133D250E5514.wmf"
    xlink:type="simple" xlink:show="embed" xlink:actuate="onLoad"/>
</draw:frame>
```

Firstly, document parser 21 obtains "Bob", and detects that the object type thereof is "text" with default font, default size, and bold property. Then document content replacer 22 generates a string with 3 characters in the English language set, "odh" for example, in accordance with a predetermined strategy for dummy data generation, and replaces "Bob" with "odh", while keeping all of the original properties unchanged. Thus, in the obtained dummy document, the string "Bob" will be changed to "odh". After that, the parser continues to parse the document objects in the XML document, check the object types, and repeat the similar processes until it meets a new object type with XML tag "draw". Document content replacer 22 then raises a request to an additional dummy data generator 23 for example for generating a graphic with svg size of "4.897 cm*4.925 cm", i.e., with the physical size of 380K. The additional dummy data generator 23 retrieves sample dummy data meeting the requirement (e.g., a graphic with the same svg size and physical size) from dummy data repository 24, and provides the same to document content replacer 22 to replace Bob's photo.

This is a simple example to show how dummy document generating unit 2 works. Of course, the random string for replacing the text content can either be generated by document content replacer 22 per se, or can be generated by the additional dummy data generator 23. Alternatively, document content replacer 22 or dummy document generator 23 can generate a blank or black graphic with the same svg size and physical size to replace the original photo, instead of retrieving material from dummy data repository 24.

In a simpler case, the generation of dummy data can also be carried out without the aforementioned dummy data generator 23 and dummy data repository 24. For example, when document content replacer 21 meets a string object in a document, it can directly take a string with the same length from a section of fixed string as dummy data. In the example above, when document content replacer 22 finds out that "Bob" is a string with the length of 3 characters, it can use "aaa" directly to replace "Bob". Likewise, if the Chinese characters ""中国"" appears in the document, document content replacer 22 may simply ignore the information of character set, but use the English characters "aaaa" to replace ""中国"" directly.

The following are examples of content replacement strategies that can be used when document content replacer 22 meets different types of document objects. When the original document object is a string or hyperlink, the content of the object in dummy document can be replaced with a random generated string with the same size, in the same character set, and even with the same number of "words". When the original document object is a native object composed by the application itself (such as drawing objects for document editor, text box, diagram, chart, etc.), the structure, properties, position information, and relation between multiple objects, if any, of the original object are kept, while the text content, if any, will be replaced under the rule for string objects. When the original document object is a embedded object composed by other applications, such as OLE objects, graphics, etc., as illustrated in the example above, a sample object most similar to the original object can be retrieved from the dummy data repository, and this sample object will be used to replace the original object, while keeping the replaced object with substantially the same properties (the same size for presentation, the same presentation properties, etc.) as the original one.

However, in same cases, sample objects in the data repository may be totally different from the original, and thus it is somewhat difficult to generate dummy content to replace such an object. Therefore, another possible way is to remove such an object simply from the dummy document by document content replacer 22, and insert a place holder in the position corresponding to the original object, to keep the metadata report of the object. The place holder described here may be a graphic or other document objects, or may even be a brief description only. In this case, the place holder must contain the description of the metadata information of the removed object, such as information on the type and size of the removed object. In this solution, the error reporting server side should have the ability to manipulate the alternative dummy data on basis of the metadata information attached to the place holder.

When the original document object is a table, the table structure and properties can be kept, and the cell contents will be replaced following other rules described above.

Persons skilled in the art will appreciate that normal error reporting can be realized while the user's privacy can be protected, as long as the base structure of the original document is retained and the content included in the dummy document does not have semantic meaning for a viewer. Therefore, those skilled in the art may carry out various modifications and improvements on the basis of the embodiments described above.

The invention claimed is:

1. A computerized method for error reporting for a software application, comprising:
    generating, using a computer system, a dummy document from an original document, wherein the dummy document maintains a skeleton of the original document and contains dummy data as its content; and
    sending, using the computer system, the generated dummy document in an error report.

2. The computerized method according to claim 1, wherein generating the dummy document further comprises:
    parsing the original document into an internal format, which reflects the skeleton and a structural description of the content of the document;
    generating dummy data using at least one strategy in accordance with document object types in the internal format;
    replacing the content of the document with the generated dummy data; and
    recovering the dummy document obtained by replacement from the internal format to a format supporting a storage and presentation of the document.

3. The computerized method according to claim 2, wherein generating the dummy document further comprises:
    generating dummy data in response to a request; and
    returning the generated dummy data for replacing the content.

4. The computerized method according to claim 3, wherein generating the dummy document further comprises:
    storing dummy data material in a dummy data repository, retrieving dummy data from the dummy data repository, and returning the retrieved dummy data for replacing the content.

5. The computerized method according to claim 4, wherein when the original document object to be replaced is a graphic or OLE object, an object similar to the original document object is retrieved from the dummy data repository as dummy data, and the similar object is returned for replacing the content.

6. The computerized method according to claim 2, wherein when the original document object comprises a string or hyperlink, a random generated string is used to replace the content of the original document object.

7. The computerized method according to claim 2, wherein when the original document object is a string or hyperlink, a string composed of characters in a character set of the original document object is used to replace the content of the original document object.

8. The computerized method according to claim 2, wherein when the original document object is a string or hyperlink, a string with a same size as the original document object is used to replace the content of the original document object.

9. The computerized method according to claim 2, wherein replacing the content removes the content data from the dummy document, and inserts a place holder in a position corresponding to the original object, which place holder keeps a metadata record of the original document object.

10. The computerized method according to claim 1, wherein the method is actively initiated by a user via a starting user interface, or is automatically initiated by the software application upon detection of an error in the application.

11. The computerized method according to claim 1, wherein the method further comprises providing the user with options to view and/or choose whether to send the error report via a sending selection user interface.

12. A method for error reporting in a software application, comprising:
    parsing an original document into an internal format which reflects a skeleton and a structural description of the document;
    obtaining a type of each document object in the original document, and determining a dummy data generation strategy for each type of document object;
    generating dummy data according to the determined dummy data generation strategies;
    replacing the content of the document with the generated dummy data, while maintaining the skeleton of the original document;
    recovering the replaced dummy document from the internal format to the original description format; and
    sending the generated dummy document as a whole or part of error report.

13. The method according to claim 12, wherein the required dummy data is retrieved from a dummy data repository storing dummy data material, in order to replace the content of the original document.

14. The method according to claim 13, wherein when the original document object is a graphic or OLE object, an object similar to the original document object is retrieved from the dummy data repository as dummy data, in order to replace the content of the original document.

15. The method according to claim 12, wherein when replacing the content of the document, an object is directly removed from the dummy document, and a place holder keeping a metadata record of the original document object is inserted into a position corresponding to the original object.

16. The method according to claim 12, wherein when the original document object is a string or hyperlink, a random generated string is used to replace the content of the original document.

17. The method according to claim 12, wherein when the original document object is a string or hyperlink, a string composed of characters in a character set of the original document object is used to replace the content of the original document object.

18. The method according to claim 12, wherein when the original document object is a string or hyperlink, a string with a same size as the original document object is used to replace the content of the original document object.

19. The method according to claim 12, wherein generating the dummy document is actively initiated by a user via a starting user interface, or is automatically initiated by the software application upon detection of an error in the application.

* * * * *